United States Patent
März et al.

(10) Patent No.: US 6,633,306 B1
(45) Date of Patent: Oct. 14, 2003

(54) ACTIVE MATRIX LIQUID CRYSTAL DISPLAY

(75) Inventors: Michael März, Steinbach (DE); Klaus Wammes, Alsheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/623,817

(22) PCT Filed: Mar. 11, 1999

(86) PCT No.: PCT/DE99/00680
§ 371 (c)(1),
(2), (4) Date: Dec. 13, 2000

(87) PCT Pub. No.: WO99/48080
PCT Pub. Date: Sep. 23, 1999

(30) Foreign Application Priority Data

Mar. 13, 1998 (DE) .......................................... 198 11 022

(51) Int. Cl.[7] ................................................ G09G 5/02
(52) U.S. Cl. ....................... 345/698; 345/695; 345/696; 345/3.3
(58) Field of Search ................................. 345/177, 208, 345/695, 696, 698, 3.3

(56) References Cited

U.S. PATENT DOCUMENTS 5,475,396 A * 12/1995 Kitajima et al. ............ 345/208

* cited by examiner

Primary Examiner—Steven Saras
Assistant Examiner—Uchendu O. Anyaso
(74) Attorney, Agent, or Firm—Kenyon & Kenyon

(57) ABSTRACT

In an active matrix liquid crystal display, pixels are arranged in rows and columns of a matrix and are controllable via row electrodes and column electrodes. To improve and to expand the possibilities of image rendering without increasing the number of rows and columns to be controlled, the pixels are divided into sub-pixels with corresponding sub-pixel electrodes, each of which is connected to the column electrode assigned to the pixel via controllable switches. On the control side, the controllable switches are connected to the row electrode assigned to the pixel via pixel control unit which is common to them. From a control signal supplied to it via the row electrode the pixel control unit generates locally and chronologically different turn-on signals for the various switches so that they switch chronologically successive different gray-scale levels of a gray-scale signal present at the column electrode through to the sub-pixel electrodes.

9 Claims, 7 Drawing Sheets

ACTIVE MATRIX LIQUID CRYSTAL DISPLAY

BACKGROUND INFORMATION

An active matrix liquid crystal display which is also described as a TFT-LCD (thin film transistor liquid crystal display) due to the controllable switches commonly in the form of thin film transistors, is described in U.S. Pat. application Ser. No. 4,635,127.

The conventional active matrix liquid crystal display has pixels arranged in rows and columns of a matrix which are formed by pixel electrodes mounted on a common carrier, a reference electrode which is common to all pixel electrodes and lies opposite them, and a liquid crystal layer located between the pixel electrodes and the reference electrodes. The pixel electrodes are connected column-by column to column electrodes via controllable switches assigned to them individually, the switches being connected to a column control unit generating various gray-scale signals for the different columns. On the control side, the controllable switches are connected row-by-row to row electrodes which are connected to a row control unit generating turn-on signals in succession for the switches in the individual rows. The terms rows and columns are interchangeable here as well as below.

To display images with various gray-scale values, gray-scale signals are applied simultaneously to all column electrodes, the gray-scale signals representing the gray-scale values of one row each; via a turn-on signal at one of the row electrodes, the gray-scale signals are switched through to the pixel electrodes of the affected row. In this manner, all rows with pixels are activated in rapid succession. The optical transparence of the liquid crystal cells, i.e., of the liquid crystal layer, is set as a function of the voltage between the particular pixel electrode and the reference electrode so that the desired image is displayed with background lighting of the active matrix liquid crystal display. To avoid gray-scale value corruptions in image rendering, the liquid crystal cells are operated in a voltage range in which the otherwise typically non-linear dependence between the transparence of the liquid crystal cells and the voltage applied to them is approximately linear.

For the display of color images, red, green and blue color filter strips are arranged in front of or behind the liquid crystals alternately column-by-column, the three adjacent liquid crystal cells lying behind or in front in a row being combined into one color pixel made up of three sub-pixels as regards their activation. In rendering color images, non-linearities between the transparence of the liquid crystal cells and the voltage applied to them can have a particularly interfering influence.

The transparence of each individual liquid crystal cell occurring as a function of the applied voltage depends on the viewing angle due to the voltage-dependent optical twisting of the liquid crystal, so that with a specific voltage applied to the liquid crystal cell, the brightness of the displayed pixel varies as a function of the viewing angle of the observer.

The use of this effect is conventional in liquid crystal displays which are designed only for bright/dark or black/white display, but not for displaying different brightness and gray-scale values. An example of this is the setting of optimum contrast ratios for a specific viewing angle. An additional example described in U.S. Pat. No. 5,526,065 is the use of such a liquid crystal display as an optical filter in front of a conventional screen in a vehicle to make the image displayed invisible in the driver's viewing angle during travel but visible to the front-seat passenger.

SUMMARY

An object of the present invention is to improve and expand the possibilities of image rendering using an active matrix liquid crystal display without increasing the number of rows and columns to be activated.

In the active matrix liquid crystal display of the present invention, each pixel is thus divided into at least two sub-pixels. To be able to activate all sub-pixels of the particular pixel independently via only one row electrode and one column electrode, a control signal is given to the row electrode which is converted at the point of the pixel via the pixel control unit located there into locally and chronologically different turn-on signals for the controllable switches assigned to the sub-pixels. During the various turn-on times in which the controllable switches are turned on, various gray-scale signal levels are applied at the column electrode so that the liquid crystal sub-cells formed by the areas of the liquid crystal layer between the sub-pixel electrodes and the reference electrode are charged to different voltages which are retained until the next activation. The activation of the sub-pixels thus takes place more or less at the same time with that of the pixels and accordingly without any appreciable delay. The optical transparence of each of the liquid crystal sub-cells is thus a function of the voltage applied to it.

The active matrix liquid crystal display of the present invention thus makes it possible to display considerably more image information than is the case with previous active matrix liquid crystal displays with the same number of row and column electrodes. Since in the active matrix liquid crystal display of the present invention all sub-pixels of each pixel are activated only via one single row electrode and one single column electrode, in the active matrix liquid crystal display of the present invention, the number of the required row and column electrodes is conversely less than in conventional active matrix liquid crystal displays with the identical image resolution by a factor corresponding to the number of sub-pixels per pixel so that the surface area of the active matrix liquid crystal display of the present invention which is opaquely covered by the row and column electrodes and consequently not available for the image display is less and, in addition, the amount of circuitry required for the row and column control unit is less.

In the context of the present invention, the control signals on the row electrodes can be converted into locally and chronologically different turn-on signals in various ways.

Thus, each control signal may be made up of chronologically successive signal pulses which are converted into the locally and chronologically different turn-on signals in the pixel control unit by means which are suitable and conventional such as shift registers, counters or serial-parallel converters. To prevent the sequence of the turn-on signals generated for the sub-pixel electrodes from being changed, for example, by interference pulses on the row electrode, each control signal preferably also contains a synchronizing pulse, the form, intensity, duration or polarity of which is different from the other signal pulses and which is used to synchronize the signal conversion for each new activation of the sub-pixels.

Alternatively for the signal conversion, each control signal is made up of chronologically successive sub-signals having different signal levels and each pixel control unit has suitable means which are conventional, such as threshold value or window comparators, for recognizing and converting the various signal levels into locally and chronologically different turn-on signals. In the simplest case, such means are made up of electrical components having a threshold value characteristic, for example, diodes.

If each pixel is always made up of only two sub-pixels, the control signal maybe be made up of two signal pulses or sub-signals which differ from each other in form, intensity, duration or polarity.

As mentioned above, the active matrix liquid crystal display of the present invention makes it possible to display considerably more image information than is the case with the previous active matrix liquid crystal displays with the same number of row and column electrodes.

Thus, various color filters can be connected upstream or downstream of the individual pixels for the display of color images. The color of each pixel is set via the different gray-scale levels of the gray-scale signal with which the do individual sub-pixels are activated, the gray-scale levels for each of the sub-pixels being equal for pure bright/dark or black/white displays.

An additional advantage of the active matrix liquid crystal display of the present invention lies in the possibility to adjust the viewing angle range within which the displayed image is visible while adhering to specific contrast conditions. As mentioned above, the optical transparence of each liquid crystal cell or liquid crystal sub-cell to be set as a function of voltage is dependent on the viewing angle. In the active matrix liquid crystal display of the present invention, the varying activation of the sub-pixels makes it possible to adjust the size and position of the viewing angle range within which the individual pixel appears with a specific brightness. For this purpose, the active matrix liquid crystal display of the present invention has an adjustment device with which the chronologically successive gray-scale levels for the individual sub-pixels of each pixel can be changed while at least approximately preserving the average gray-scale level of all such sub-pixels. In this manner, the viewing angle-dependent brightness levels of the individual sub-pixels are changed while the total brightness of the pixels formed from them is as a whole unchanged.

Since, as already mentioned above, the dependence between the transparence of the individual liquid crystal cells and liquid crystal sub-cells and the voltage applied to them is typically non-linear, the liquid crystal sub-cells are either operated in a voltage range in which this dependence is approximately linear or the gray-scale signals supplied to the liquid crystal sub-cells are distorted in a correction device on the basis of information concerning the typical dependence between the transparence of liquid crystal sub-cells and the voltage applied to them and as a function of the gray-scale levels in such a manner that an at least approximately linear relationship arises between the transparence of the liquid crystal sub-cells and the undistorted gray-scale signals. In the later case, the contrast conditions for specific viewing angle ranges can be set via a largely unlimited selection of the voltage range in which the liquid crystal sub-cells are operated without the occurrence of corruptions of the image rendering.

When the active matrix liquid crystal display of the present invention is used in a vehicle, it is thus possible to hide the displayed image in the viewing angle range of the vehicle driver in the same manner as is described in the aforementioned U.S. Pat. No. 5,526,065, while it is visible to the front-seat passenger; in contrast to the conventional methods, image rendering takes place directly via the active matrix liquid crystal display which is by far better suited for use in vehicles than conventional screens due to, among other things, its smaller mounting depth. An additional possibility for use of the active matrix liquid crystal display of the present invention is the display of three-dimensional objects, different views of one and the same object being displayed for different viewing angle ranges which can be set.

To be able to display different images for different viewing angle ranges in an advantageous manner, it is provided in connection with the present invention that the column control unit has means for the sequential arrangement of the gray-scale signals supplied by at least two different image signal sources in the gray-scale signals generated by it so that sub-pixels of each pixel are activated with the gray-scale levels of at least two different images.

With the simultaneous rendering of different images in different viewing angle ranges, it is, for example, possible in a motor vehicle to display traffic information to the driver and to present a video film to the front-seat passenger at the same time. In a like manner, it is possible to show different images (videos) via a single active matrix liquid crystal display to passengers sitting side-by-side in rail coaches or airplanes.

As stated above, the viewing angle range within which the pixels are each visible with a specific brightness can be changed by the different activation of the sub-pixels of the individual pixels; in particular, the displayed image can be hidden in specific viewing angle ranges in this manner or different images can be displayed in different viewing angle ranges. As a supplement or as an alternative to this, it can be provided in connection with the present invention that the liquid crystal layer is divided in the area of each individual pixel into domains assigned to the individual sub-pixels with varying orientations of the liquid crystal. For the simultaneous display of two different images in two different viewing angle ranges, for example, the sub-pixels for which the liquid crystals lie in a first direction are activated with the gray-scale levels supplied by a first image signal source and the sub-pixels for which the liquid crystals lie in a second direction are activated with the gray-scale levels supplied by a second image signal source. Accordingly, for the display of a single image of the viewing angle range within which the image is visible, the change can be made that either the sub-pixels with the liquid crystals lying in the first direction or the sub-pixels with the liquid crystals lying in the second direction or all sub-pixels are activated. A suitable number of sub-pixels or individual activation of the sub-pixels thus makes it possible to display different images in different viewing angle ranges and to change the viewing angle ranges.

The active matrix liquid crystal display offers the advantage that a defect in one individual sub-pixel can be compensated by changing the activation of the remaining sub-pixels so that the overall brightness of the pixel made up of the affected sub-pixels does not change.

DETAILED DESCRIPTION

Figure 1:
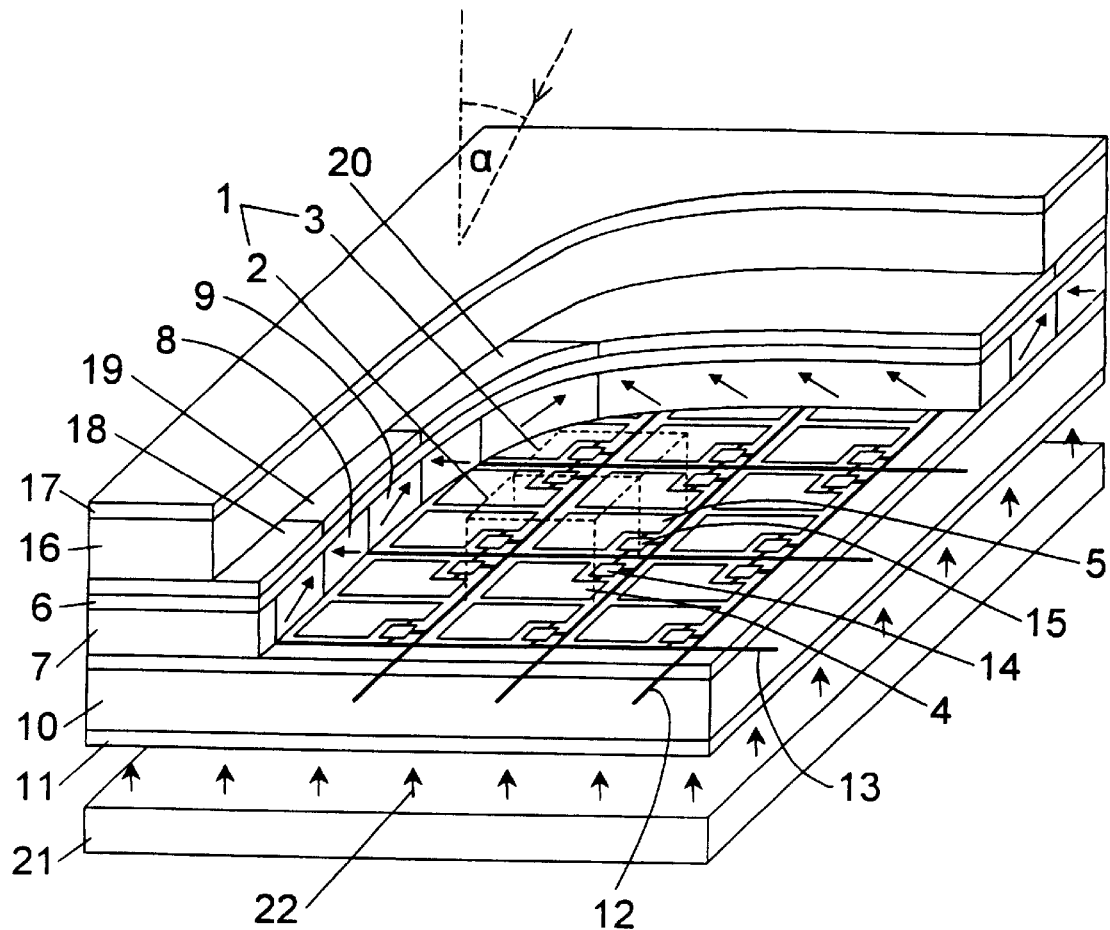
FIG. 1 shows an example of the design of the active matrix liquid crystal display of the present invention.

FIG. 1 shows an example of the design of the active matrix liquid crystal display of the present invention without the associated control electronics. The active matrix liquid crystal display contains pixels 1 arranged in rows and columns of a matrix, each pixel being made up of at least two sub-pixels 2 and 3. Each sub-pixel 2 and 3 is formed from a transparent sub-pixel electrode 4 and 5, respectively, a transparent reference electrode 6 which is common to all or at least a part of sub-pixels 1 of the active matrix liquid crystal display and a liquid crystal layer 7 located between sub-pixel electrodes 4 and 5 and reference electrode 6. The areas lying between sub-pixel electrodes 4 and 5 and reference electrode 6 of liquid crystal layer 7 are identified below as liquid crystal sub-cells. Liquid crystal layer 7 is divided with varying orientation of the liquid crystals in domains 8 and 9, different domains 8 and 9 being assigned to the various sub-pixels 2 and 3 of each pixel 1. In the exemplary embodiment shown, domains 8 and 9 are provided with two different orientations of the liquid crystals, one domain 8 and 9 being assigned to each of the columns of sub-pixels 2 and 3 arranged horizontally in this case.

Sub-pixel electrodes 4 and 5 are formed on the upper side of a glass plate 10 which bears a polarization film 11 on its underside. In addition, row electrodes 12 and column electrodes 13 are formed on the upper side of glass plate 10 in such a way that one of row electrodes 12 is always assigned to each row of pixels 1 and one of column electrodes 13 is always assigned to each column of pixels 1. Sub-pixel electrodes 4 and 5 of each individual pixel 1 are connected with each assigned column electrode 13 via controllable switches, which in turn, are connected to each assigned row electrode 12 via a pixel control unit. In the embodiment shown here, the controllable switches formed as thin film transistors together with the circuit components of the pixel control unit which control them are identified by reference symbols 14 and 15.

Transparent reference electrode 6 is covered with an upper glass plate 16 onto which an additional polarization film 17 is applied. To display color images, red, green and blue color filter strips 18, 19 and 20 are arranged alternately by columns between reference electrode 6 and upper glass plate For image rendering, light 22 is beamed via background lighting 21 through liquid crystal layer 7 and from the liquid crystal sub-cells it is switched through via row and column electrodes 12 and 13 with varying brightnesses depending on activation. Light 22 is first polarized by lower polarization film 11 (polarizer). In the individual liquid crystal cells, the liquid crystals are optically twisted as a function of the electrical voltage between the particular sub-pixel electrode 4 and 5 and reference electrode 6 so that the polarization direction of the polarized light passing through the liquid crystal is correspondingly twisted. In upper polarization film 17 (analyzer), this twisting of the polarization direction results in a brightness reduction of the emerging light which is more or less intense as a function of the degree of twisting.

Figure 2:
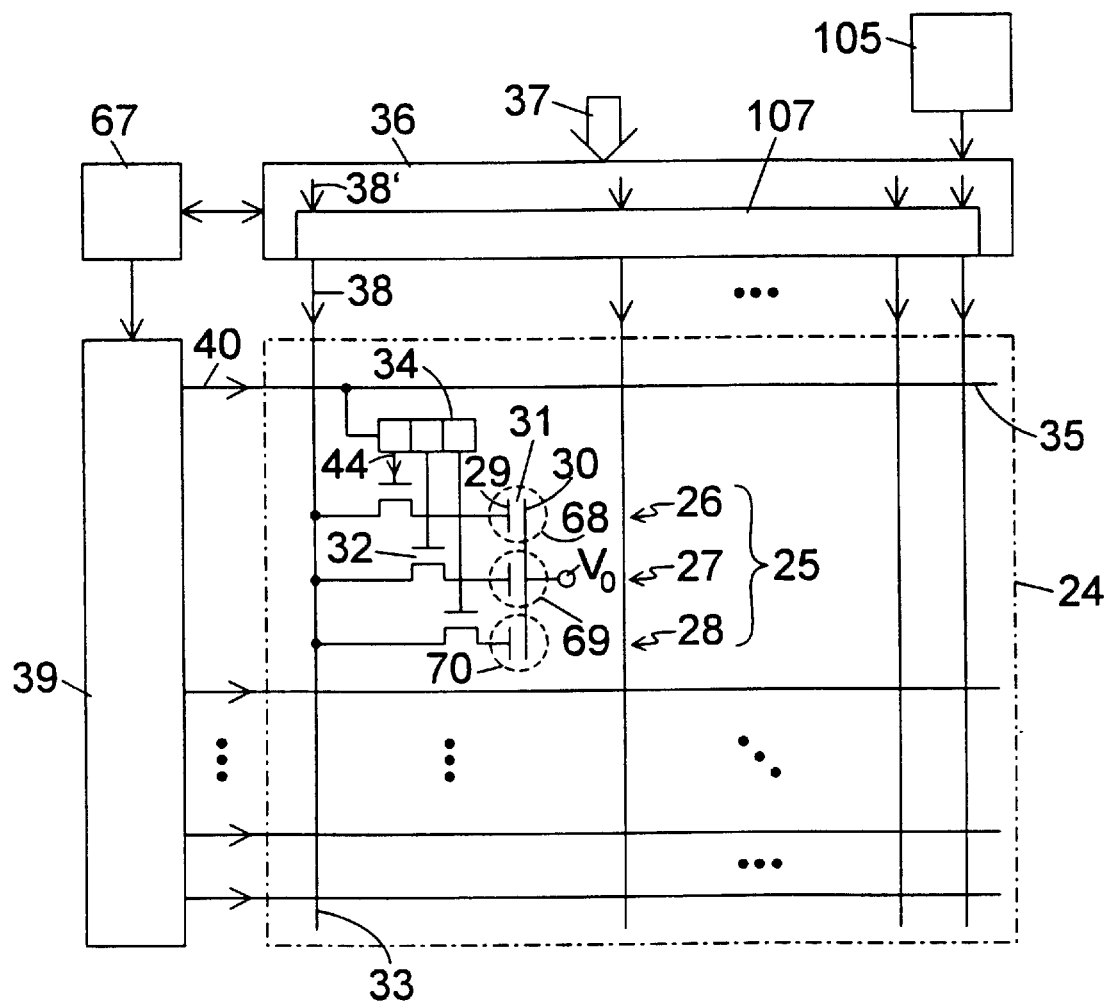
FIG. 2 shows an embodiment of the active matrix liquid crystal of the present invention in the form of a block diagram.

FIG. 2 shows an embodiment of the active matrix liquid crystal display in the form of a block diagram. In the rows and columns of a matrix 24, pixels 25 are arranged, each of which is made up of three sub-pixels 26, 27 and 28. Each sub-pixel, e.g., 26 is formed from a sub-pixel electrode 29, a reference electrode 30 common to all pixels 25 of matrix 24 and a liquid crystal sub-cell 31 lying between them. A reference potential $V_0$ is applied to reference electrode 30. Sub-pixel electrodes 29 are connected with a column electrode 33 which is assigned to associated pixel 25 and all other pixels in the same column via controllable switches 32 assigned to sub-pixel electrodes 29 individually. Controllable switches 32, each of which is associated with a pixel 25, are connected on the control side to a pixel control unit 34 which in turn is connected to a row electrode 35 which is assigned to associated pixel 25 and all other pixels in the same row.

Column electrodes 33 are connected to a column control unit 36 which, on the basis of image signals 37 supplied to it, simultaneously generates different gray-scale signals 38 for the pixels 25 located in one row each and chronologically successive varying gray-scale values 38 for pixels 25 in the various rows and applies them to column electrodes 33. A row control unit 39, to which row electrodes 35 are connected, consecutively generates one control signal 40 for each row with which gray-scale signals 38 are switched through to activate pixels 25 in the affected row. A synchronizing device 67 assigned to the two control units 36 and 39 brings about synchronization between chronologically successive gray-scale signals 38 for the different rows and control signals 40 for the individual rows.

Figure 3:
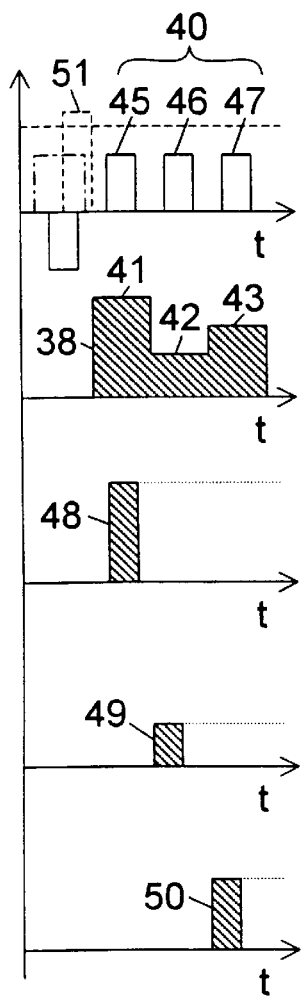
FIGS. 3 to 5 show different examples of the activation of the sub-pixels.
Figure 4:
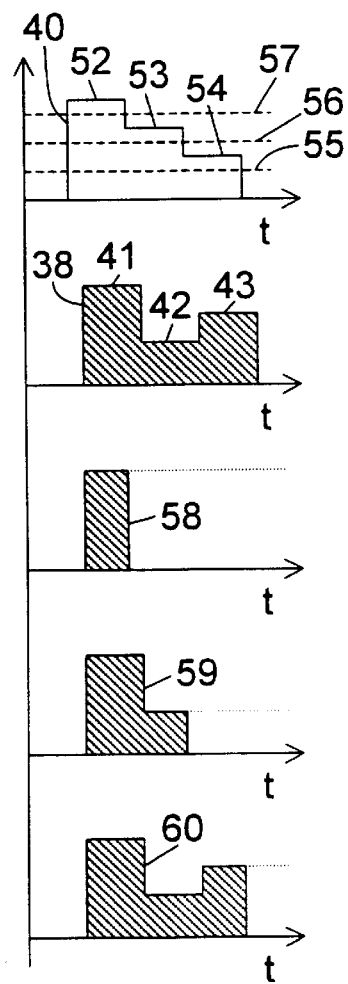
Figure 5:
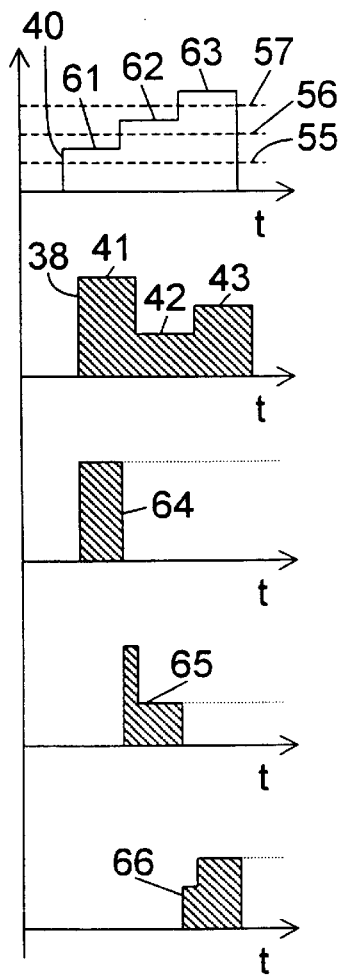

To be able to activate sub-pixels 26, 27 and 28, which form a pixel 25, independently of each other during each activation of a pixel 25, gray-scale signals 38, as FIGS. 3, 4 and 5 show, are each made up of chronologically successive varying gray-scale levels 41, 42 and 43 for the various pixels 26, 27 and 28. Control signal 40 has such a form that in pixel control unit 34, it is converted into separate turn-on signals 44 for controllable switches 32 so that the various gray-scale levels 41, 42 and 43 are switched through to the various sub-pixel electrodes 29 and accordingly to the various liquid crystal sub-cells 31.

In the example shown in FIG. 3, control signal 40 is made up of three consecutive signal pulses 45, 46 and 47 which are supplied to controllable switches 32 as turn-on signals 44 in local and chronological sequence by pixel control unit 34 designed as a shift register, counter, or serial-parallel converter. Thus, different signals 48, 49 and 50 with gray-scale levels 41, 42 and 43 reach various sub-pixel electrodes 29 from column electrode 33 via controllable switches 32 so that the associated liquid crystal sub-cells 31 are charged to different voltages and retain them until the next activation. Corresponding to the different voltages, different levels of optical transparence and brightness occur at liquid crystal sub-cells 31. To prevent the sequence of turn-on signals 44 generated for sub-pixel electrodes 29 from being changed, for example, by interference pulses, each control signal contains, in addition, a synchronizing pulse 51 which differs from the other signal pulses 45, 45 and 47 in shape, intensity, duration or polarity and with which the signal conversion in pixel control unit 34 is synchronized with each new activation of sub-pixels 26, 27 and 28.

In the example shown in FIG. 4, control signal 40 is made up of three consecutive sub-signals with gradually decreasing signal levels 52, 53 and 54. In pixel control unit 34, control signal 40 is compared with three different threshold values 55, 56 and 57 which are assigned to the individual controllable switches 32 and which if exceeded, cause the particular assigned controllable switch 32 to be turned on. The sub-signal having signal level 52 exceeds all threshold values 55, 56 and 57 so that initially all controllable switches 32 are turned on. The following sub-signal having signal level 53 now only exceeds threshold values 55 and 56 so that controllable switch 32, to which threshold value 52 is assigned, is turned off. In the case of the last sub-signal with signal level 54, only threshold value 55 is still exceeded so that now only the particular assigned controllable switch 32 is turned on. From column electrode 33, thus different signal components 58, 59 and 60 of gray-scale signal 38 reach the various sub-pixel electrodes 29 from column electrode 33, the different gray-scale levels 41, 42 and 43 at the end of the particular turn-on time of controllable switches 32 being critical for the voltage at which the associated liquid crystal sub-cells 31 are charged.

In the example shown in FIG. 5, control signal 40 is also made up of three successive sub-signals having different signal levels 61, 62 and 63. In contrast to the example described before, control signal 40 in pixel control unit 34 is not only checked to determine if it exceeds threshold values 55, 56 and 57, but also if the signal is below individual threshold values 56 and 57 so that pixel control unit 34 functions as a window comparator. In the example shown, the three controllable switches 32 are turned on individually as a function of whether the sub-signal with signal level 61 exceeds minimum threshold value 55 and does not reach average threshold value 56, whether the sub-signal with signal level 62 exceeds mean threshold value 56 and does not reach upper threshold value 57 or whether the sub-signal with signal level 63 exceeds upper threshold value 57. Thus, different signal components 64, 65 and 66 of gray-scale signal 38 with different gray-scale levels 41, 42 and 43 reach the different sub-pixel electrodes 29 from column electrode 33 via controllable switches 32.

Figure 6:
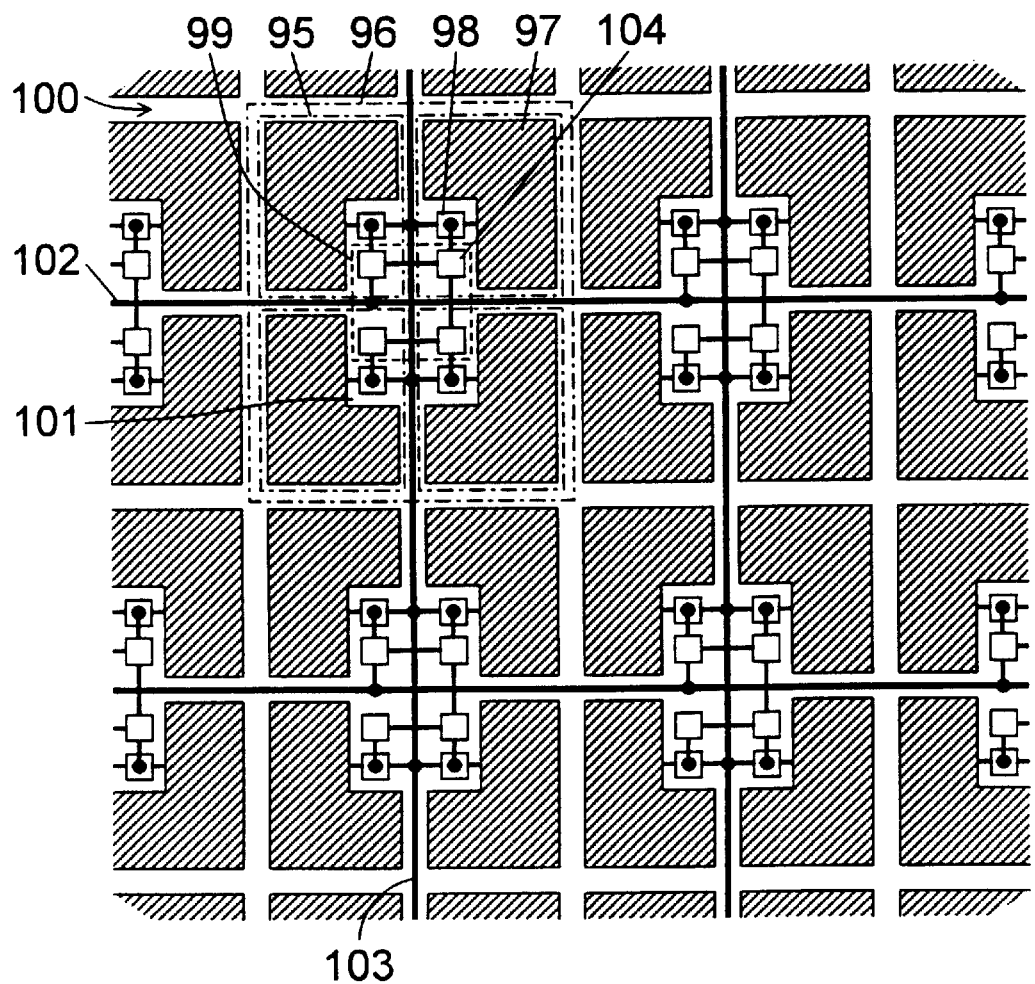
FIG. 6 shows an example of the arrangement of the sub-pixel electrodes with the associated controllable switches and the pixel control units.

FIG. 6 shows how, for example, in an active matrix liquid crystal display having pixels 96 each made up of four sub-pixels 95, sub-pixel electrodes 97 having controllable switches (thin film transistors) 98 assigned to them and pixel control units 99 can be arranged on a common carrier 100. Sub-pixel electrodes 97 formed in an L-shape lie opposite each other in such a way that their recesses 101 form an open area in which row electrodes 102 associated with the particular pixel 96 and column electrodes 103 intersect. Controllable switches 98 via which sub-pixel electrodes 97 are connected with column electrode 103 are arranged in individual recesses 101. In addition, those circuit components 104 of pixel control unit 99 with which the assigned controllable switches are activated are arranged in individual recesses 101. In the embodiment shown, pixel control unit 99 is made up of a shift register which is connected to row electrode 102 on the input side and whose successive register locations correspond to individual circuit components 104 of pixel control unit 99.

If the number of row and column electrodes is the same, substantially more image information can be displayed than in conventional active matrix liquid crystal displays due to the sub-pixels which can be activated independently of each other. Thus for the color image rendering of individual pixels 25, a red, green and blue color filter 68, 69 and 70 can be arranged before or after each of the associated sub-pixels 26, 27 and 28 in the beam path of light 22 in the embodiment of FIG. 2.

Figure 7:
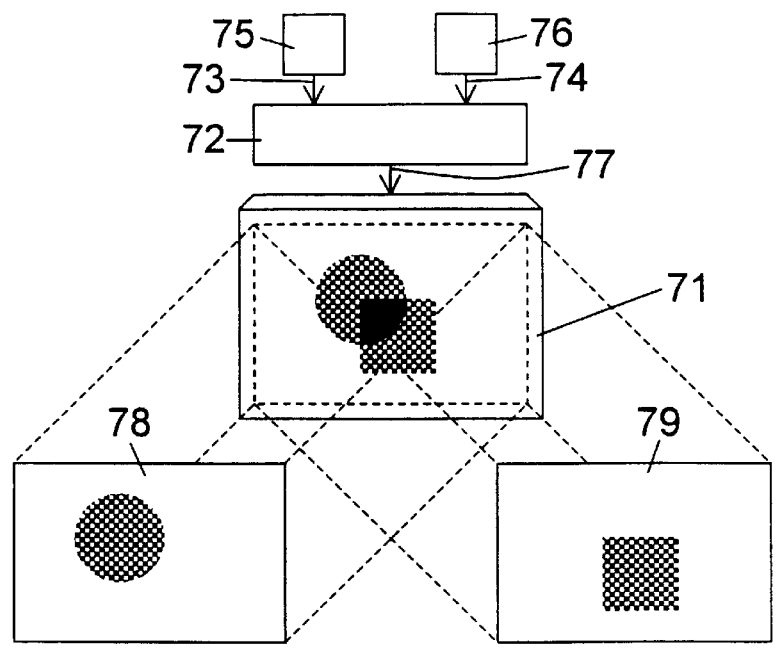
FIGS. 7 and 8 show different examples of the use of the active matrix liquid crystal display of the present invention.

FIG. 7 shows an additional embodiment of active matrix liquid crystal display 71 of the present invention in which the individual pixels are each made up of two sub-pixels to which different domains of the liquid crystal layer have been assigned with different orientations. An example of this was described above with reference to FIG. 1. Image signals 73 and 74 from two different image signal sources 75 and 76 are supplied to active matrix liquid crystal display 71 via a signal processing device 72 which is a component of column control unit 36. Signal processing device 72 combines the two different image signals 73 and 74 into a single image signal 77 which is made up of the gray-scale level of image signal 73, followed by the gray scale value of image signal 74. In the simplest case, this occurs by switching over between image signals 73 and 74 at a frequency which is double the sequence of image signals 73 and 74. Of the two sub-pixels of one individual pixel of active matrix liquid crystal display 71, one is activated with the gray-scale level of image signal 73 and the other with the gray-scale level of image signal 74, as was described with reference to FIGS. 2 to 5. In this manner, active matrix liquid crystal display 71 produces two different images 78 and 79 which are interleaved by sub-pixels, the different images being visible in different viewing angle ranges due to the fact that the liquid crystal layer is also divided by sub-pixels into different domains with different orientations of the liquid crystals.

Figure 8:
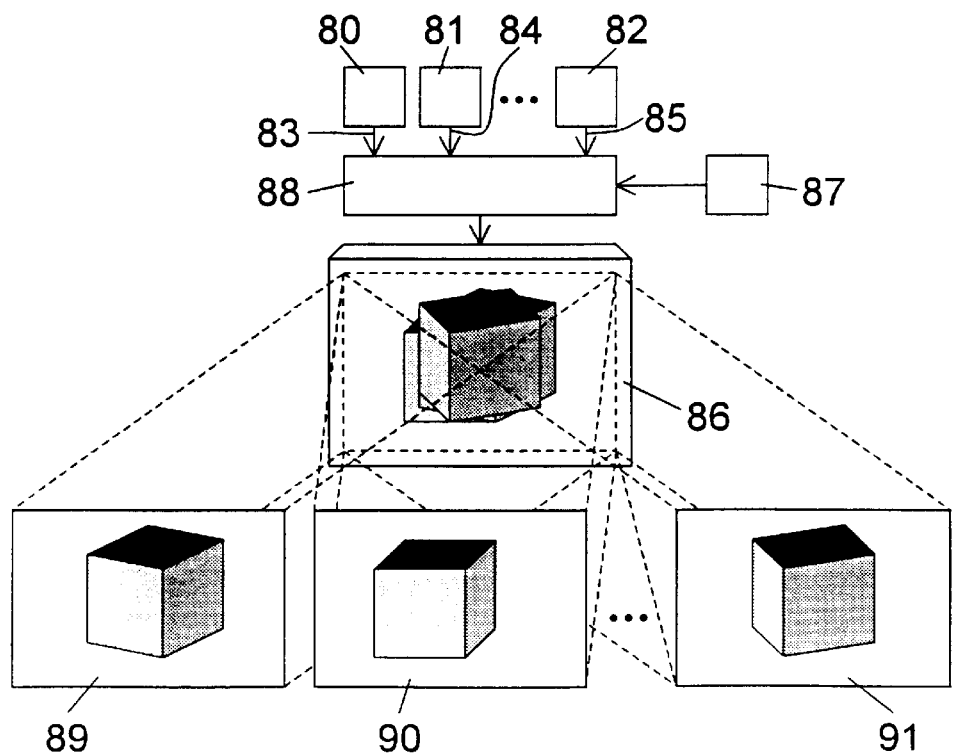

FIG. 8 shows an embodiment in which several image signal sources 80, 81 and 82 deliver image signals 83, 84 and 85 of different views of a three-dimensional object. In active matrix liquid crystal display 86 used here, the pixels and the liquid crystal layer have a number of sub-pixels or domains having varying orientations assigned to them which corresponds to the number of image signal sources 80, 81 and 82. Image signals 83, 84 and 85 are supplied to active matrix liquid crystal display 86 via a switchover device 88 controlled by an adjustment device 87. Via adjustment device 87, the various switch positions of switchover device 88 can be set so that active matrix liquid crystal display 86 generates different images 89, 90 and 91 which display different views of the three-dimensional object for different viewing angle ranges, thus resulting in a three-dimensional display of the object. Of course, the different images 89, 90 and 91 may also be displayed simultaneously as was described with reference to FIG. 7.

Figure 9:
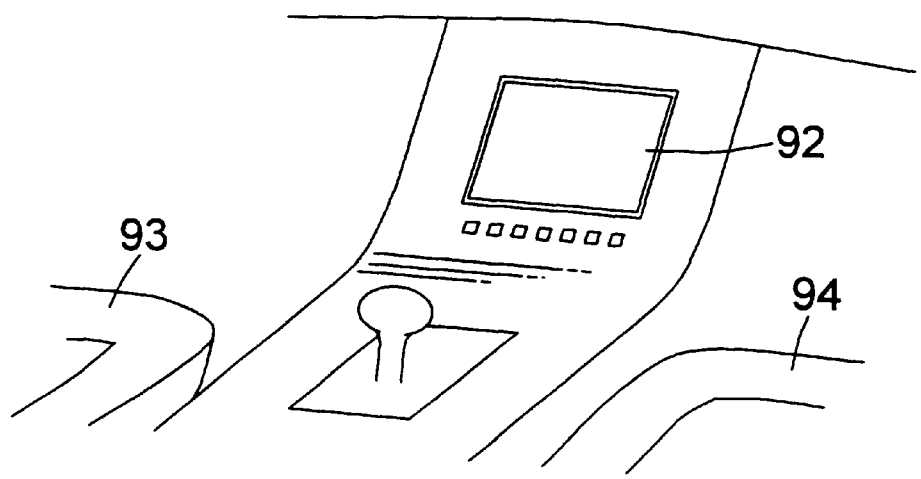
FIG. 9 shows an example of installation of the active matrix liquid crystal in a vehicle.

Instead of displaying several different images for different viewing angle ranges, it is possible in the same manner to display one and the same image optionally either in one of, for example, two different viewing angle ranges, the other viewing angle range, or for both viewing angle ranges. Accordingly, if the active matrix liquid crystal display is installed in a vehicle, the displayed image can be made invisible in the driver's viewing angle range during travel but visible to the front seat passenger. FIG. 9 shows an example of the installation of active matrix liquid crystal display centered roughly in front of driver's seat 93 and passenger's seat 94.

In the embodiments of the active matrix liquid crystal display of the present invention described previously, the different viewing angle ranges within which the displayed image or the displayed images are visible to the observer are set by activating the sub-pixels with the differently oriented liquid crystals in the domains assigned to them independently of each other. In supplement or alternative to this, the viewing angle range can be set by changing the potential difference between the reference potential at the reference electrode and the potential level of the gray-scale level switched through to the sub-pixel electrodes.

Figure 10:
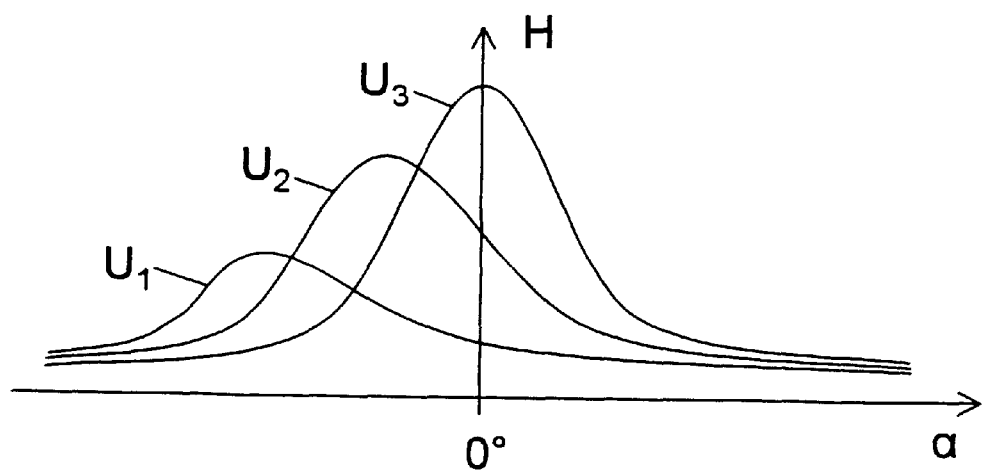
FIG. 10 shows an example of the dependence between the brightness of a pixel and the viewing angle.

As FIG. 10 shows, brightness H of the light emerging from an active matrix liquid crystal display and thus the contrast of the particular image displayed is dependent on viewing angle α. Moreover, this dependence also varies with voltage, in this case, for example, three different voltages U1, U2 and U3 applied to the liquid crystals of the conventional liquid crystal cells of the conventional active matrix liquid crystal displays and the liquid crystal sub-cells of the active matrix liquid crystal display of the present invention.

Figure 11:
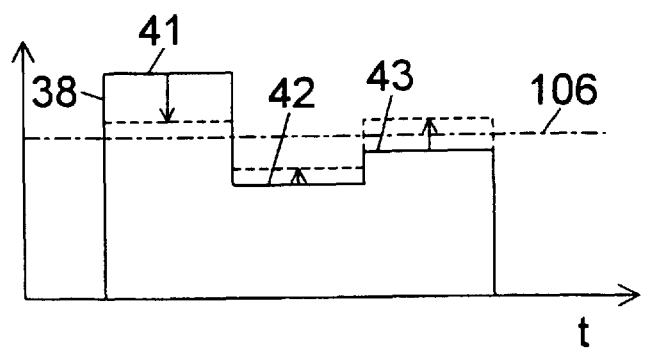
FIG. 11 shows an example of the non-linear dependence between the brightness of the pixel or the optical transparence of the associated liquid crystal cell and the voltage applied to it.

For that reason, an adjustment device 105 is provided in the active matrix liquid crystal display shown in FIG. 2 with which, as is shown for example in FIG. 11, gray-scale levels 41, 42 and 43 of gray-scale signal 38, which are chronologically successive and serve the purpose of activating individual sub-pixels 26, 27 and 28, can be changed while at least approximately preserving average gray-scale level 106. In this manner, the viewing angle-dependent levels of brightnesses of individual sub-pixels 26, 27 and 28 are changed while the overall brightness of pixel 25 formed from them is largely unchanged.

Figure 12:
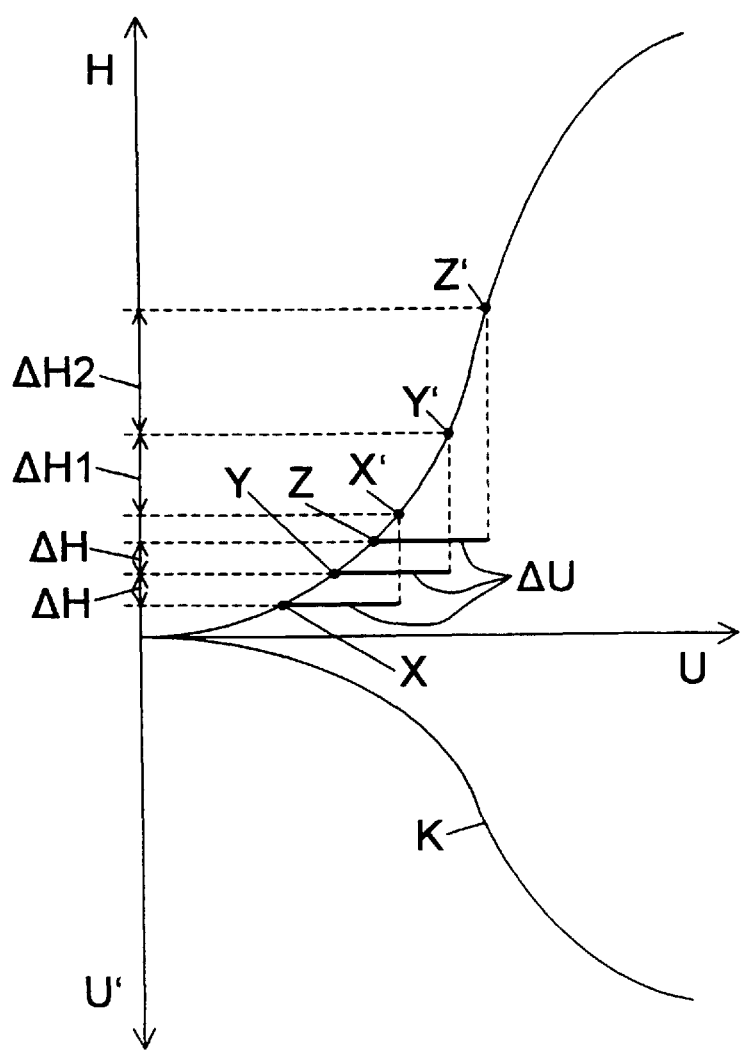
FIG. 12 shows an example of the distortion of the gray-scale signals.

As FIG. 12 shows, however, the dependency relationship between brightness H or synonymously the optical transparence of liquid crystal cells and liquid crystal sub-cells 31 and the particular voltage U applied to them is typically non-linear. Ordinarily, liquid crystal cells are therefore operated in a voltage range in which this dependence is largely linear. In the non-linear ranges, it is possible, as is explained below, for corruptions of the image rendering to occur. For example, three pixels X, Y and Z are observed which are simultaneously generated by three different liquid crystal cells 9, pixel Z being an amount ΔH brighter than pixel Y which is in turn brighter than pixel X by the same amount. If the voltages applied to the three liquid crystal cells 9 are now changed by the same amount ΔU, the brightness interval between pixels X, Y and Z changes in a non-linear manner, a brightness interval ΔH1 being generated between new pixels X' and Y' and a brightness interval ΔH2 which is different from it being generated between new pixels Y' and Z'. This brightness corruption is particularly noticeable in the form of color corruptions in the rendering of color images and is accordingly even more disturbing than with pure gray-scale image rendering.

As FIG. 2 shows, column control unit 36 contains a correction device 107 in which gray-scale signals 38', before being applied to column electrodes 33, are distorted on the basis of information concerning the typical dependence between the optical transparence of liquid crystal cells 31 and voltage U applied to them shown in FIG. 12 and in dependence on the potential difference between gray-scale signals 38' and reference potential $V_0$, in such a way that an at least approximately linear relationship results between the optical transparence of liquid crystal cells 31 and undistorted gray-scale signals 38'.

FIG. 12 shows as an example a characteristic curve K, according to which undistorted gray-scale signals 38' having voltage U' can be converted into distorted gray-scale signals 38 having voltage U in correction device 107. The conversion may also take place digitally, characteristic curve K then being present in the form of a value table in a memory which is not shown here.

What is claimed is:

1. An active matrix liquid crystal display, comprising:
   pixels arranged in rows and columns of a matrix, each of the pixels including at least two sub-pixels, and each of the pixels being formed from at least two adjacent sub-pixel electrodes, a reference electrode being common to the pixels, and a liquid crystal layer lying between the sub-pixel electrodes and the reference electrode;
   row electrodes, a respective one of the row electrodes being assigned to each row of pixels;
   column electrodes, a respective one of column electrodes being assigned to each column of the pixels;
   a row control unit connected to the row electrodes and successively generating control signals for the rows of pixels;
   a column control unit connected to the column electrodes and generating gray-scale signals having chronologically success gray-scale levels for the sub-pixels;
   pixel control units individually assigned to the pixels; and
   controllable switches individually assigned to the sub-pixels, the sub-pixel electrodes being connected to an assigned one of the column electrodes via a respective one of the controllable switches, a control side of the respective one of the controllable switches being connected to an assigned one of the row electrodes via one of the pixel control units assigned to the sub-pixels, each of the pixel control units generating locally and chronologically different turn-on signals for the controllable switches assigned to the sub-pixels from the control signals supplied via one of the row electrodes;
   wherein each of the control signals includes individual, chronologically successive signal pulses, each of the pixel control units including an arrangement that converts the chronologically successive signal pulses into the locally and chronologically different turn-on signals.

2. The active matrix liquid crystal display according to claim 1, wherein each arrangement that converts the chronologically successive signal pulses includes one of: i) a shift register, ii) a counter and iii) a serial-parallel converter.

3. The active matrix liquid crystal display according to claim 1, wherein each of the control signals includes a synchronizing pulse that is different from the signal pulses, and wherein each of the pixel control units includes an arrangement for recognizing the synchronizing pulse and for synchronizing the signal conversion.

4. The active matrix liquid crystal display according to claim 1, wherein color filters are assigned to the individual sub-pixels of each of the pixels.

5. The active matrix liquid crystal display according to claim 1, further comprising:
   an adjustment device to variably adjust the chronologically successive gray-scale levels for the sub-pixels while preserving an average gray-scale level of all of the sub-pixels of a pixel.

6. The active matrix liquid crystal display according to claim 1, wherein the column control unit includes an arrangement to sequentially arrange the gray-scale levels, delivered by at least two different image signal sources, in the gray-scale signals generated by the column control unit.

7. The active matrix liquid crystal display according to claim 1, wherein in an area of each individual one of the pixels, the liquid crystal layer is divided into domains having different orientations of liquid crystals, the domains being assigned to the individual sub-pixels of the individual one of the pixels.

8. The active matrix liquid crystal display according to claim 1, wherein the pixel control units, together with the sub-pixel electrodes, the controllable switches, the row electrodes and the column electrodes are arranged on a common carrier.

9. The active matrix liquid crystal display according to claim 1, wherein the active matrix liquid crystal display is arranged in a vehicle approximately centered in from of laterally adjacent passenger seats.

* * * * *